Figure 1:
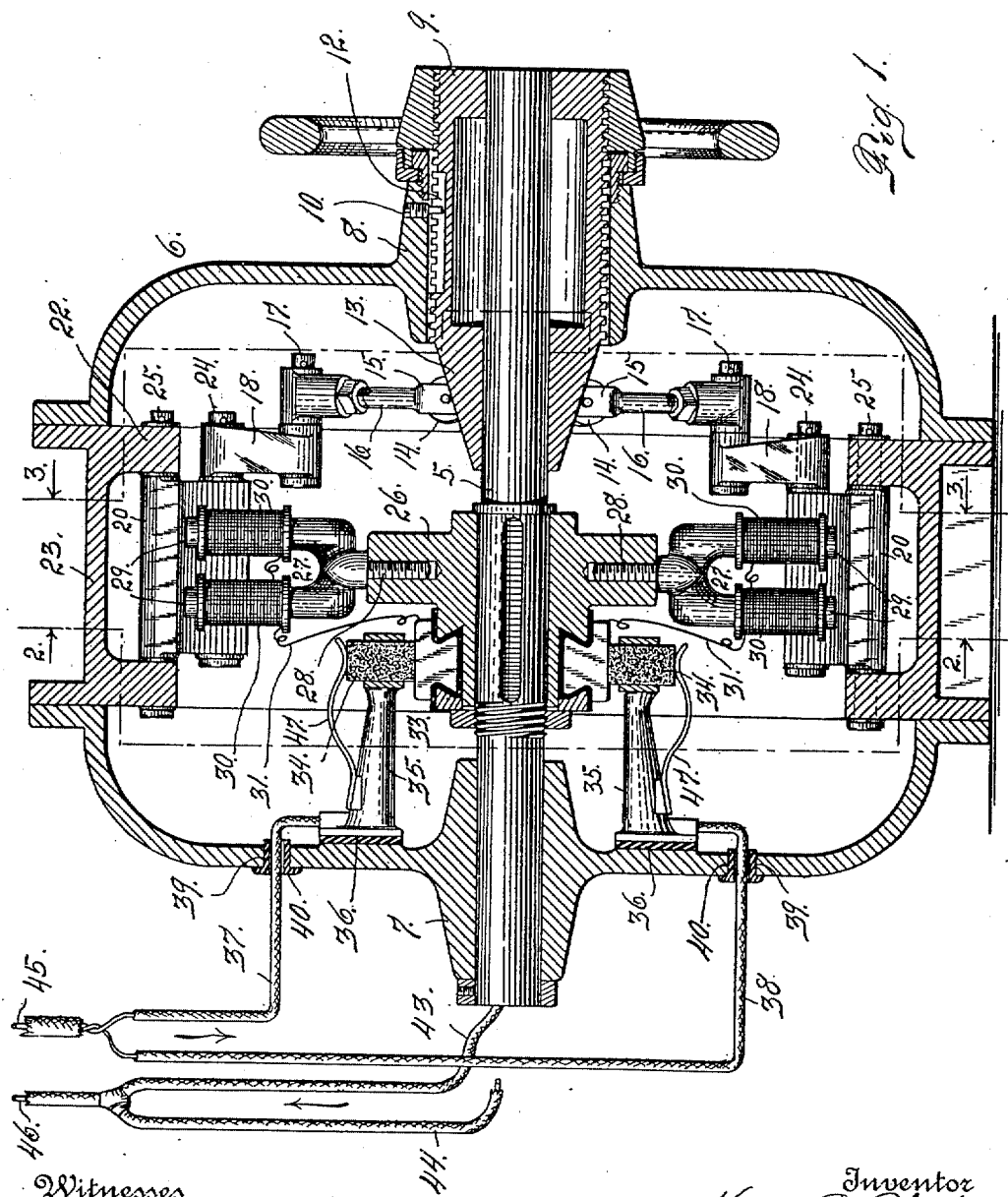

H. A. RHODES.
ELECTRICAL MOTOR.
APPLICATION FILED SEPT. 13, 1909.

981,881.

Patented Jan. 17, 1911.
3 SHEETS—SHEET 1.

Witnesses
Otto E. Hoddick.
I. D. Thornburgh.

Inventor
Harry A. Rhodes.
By A. J. O'Brien.
Attorney

H. A. RHODES.
ELECTRICAL MOTOR.
APPLICATION FILED SEPT. 13, 1909.
981,881.
Patented Jan. 17, 1911.
3 SHEETS—SHEET 2.
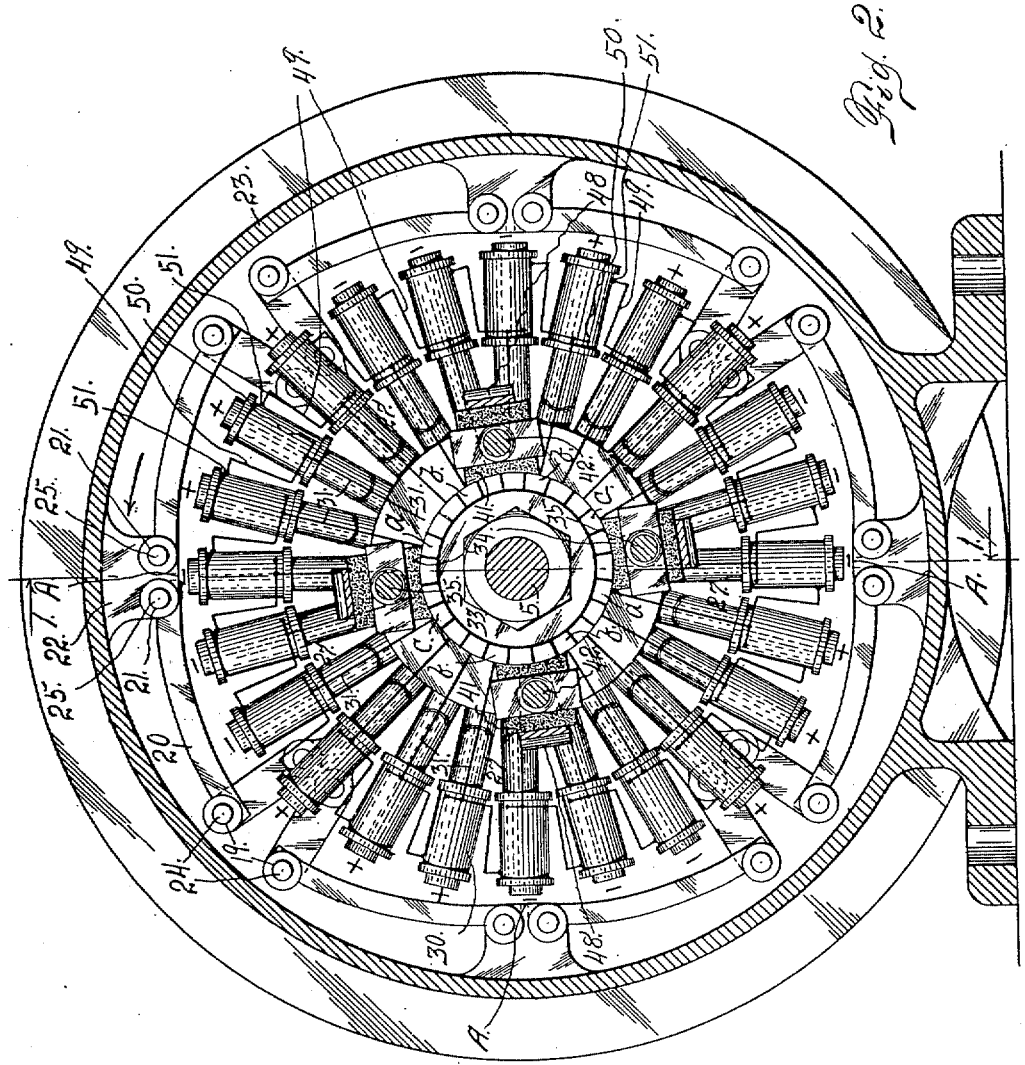
Witnesses
Otto E. Hoddick.
I. D. Thornburgh.
Inventor
Harry A. Rhodes.
By A. J. O'Brien.
Attorney H. A. RHODES.
ELECTRICAL MOTOR.
APPLICATION FILED SEPT. 13, 1909.
981,881.
Patented Jan. 17, 1911.
3 SHEETS—SHEET 3.
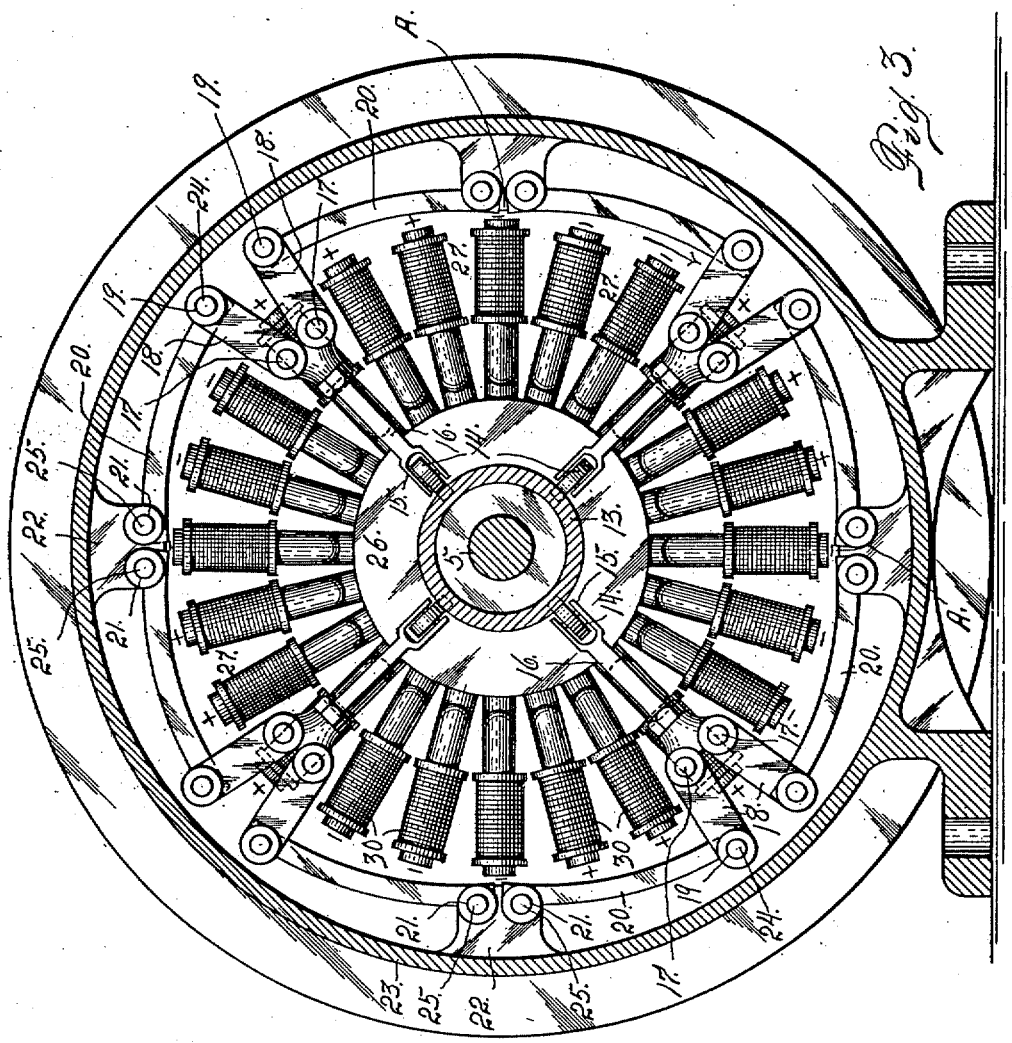

UNITED STATES PATENT OFFICE.

HARRY A. RHODES, OF DENVER, COLORADO, ASSIGNOR TO THE UNIVERSAL MOTOR COMPANY, OF DENVER, COLORADO, A CORPORATION OF ARIZONA TERRITORY.

ELECTRICAL MOTOR.

981,881.     Specification of Letters Patent.     Patented Jan. 17, 1911.

Application filed September 13, 1909. Serial No. 517,470.

*To all whom it may concern:*

Be it known that I, HARRY A. RHODES, a citizen of the United States, residing in the city and county of Denver and State of Colorado, have invented certain new and useful Improvements in Electrical Motors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in electrical motors, my object being to provide a device of this class which shall be of simple construction, economical in cost, reliable, durable and efficient in use.

It has always been the tendency of designers of electric motors to simplify the construction as much as possible, thus reducing the cost of manufacturing, in order to produce a competitive article. It is obvious that the cost of the winding of any motor is a big percentage of the total cost of construction. With this fact in mind, I have succeeded in designing an electro-magnetic motor having only one winding, which I shall call the field. It consists of a series of straight wound coils on iron cores, as this is the most simple form of winding. The stationary part of my motor has no winding at all; there are several segments of curved iron, or steel, which are located eccentrically to the field. In this design, I use also a commutator for short-circuiting certain coils, as will be hereinafter more fully explained.

It is a well known fact that the magnetic flux of any magnet will always travel the shortest way with the least resistance. For instance, if I bring an iron armature within the reach of a magnetic field, the magnetic resistance of air is so much greater than the resistance of iron, there will be a tendency to put said iron armature in such a position as to allow the magnetic lines or flux to take the shortest way. Therefore, I can say a certain force is working on the armature. This principle I have applied in my present improvement.

In explaining the working of the motor, in a preliminary way, it will suffice if I describe one segment only, as all of the segments are substantially identical.

The field coils of my motor are arranged concentrically around the motor center; the commutator having as many segments as there are coils and the connections being made as shown. I also employ as many brushes as there are eccentric segments. Now supposing current is sent through the field coils, as the armature is eccentrically located, the lines of force will move my system of field coils around the motor axis, in order to reach the place with the shortest air gap. At the moment, however, that the first coil reaches this place, it will be short-circuited through the commutator, the brushes being the medium therefor. The other coils still energized, will continue to turn my motor till the next coil reaches the shortest air gap, where it will be short-circuited, as the first was. In the meantime, the coil having been short-circuited first, is energized again, and works the rest of the coils in the same direction. Then the third coil will be short-circuited first, etc. It is thus obvious that I have a rotary motor of almost equal torque at any point of the circumference.

As can be seen in the drawing, the armature segments are arranged in such a way as to allow a regulation of the air gap. In other words the said segments are adjustable. Thus the speed can be changed mechanically from a given maximum to zero.

Having briefly outlined my improved construction, I will proceed to describe the same in detail, reference being made to the accompanying drawing, in which is illustrated an embodiment thereof.

In this drawing: Figure 1 is a central, vertical section taken through my improved motor approximately on the line 1—1, Fig. 2. Fig. 2 is a section taken on the line 2—2, Fig. 1, looking toward the right. Fig. 3 is a section taken on the line 3—3, Fig. 1, looking toward the left.

The same reference characters indicate the same parts in all the views.

Let the numeral 5 designate the shaft of my improved motor and 6 the shell or casing thereof. At one extremity this casing is provided with an integral hub 7, in which the shaft 5 is journaled. The opposite extremity is provided with a hollow hub 8, in which is inserted an exteriorly-threaded cylindrical member 9, locked against rotation by a fastening screw 10, whose inner extremity enters a longitudinal groove 12, formed in the member 9, to allow the latter to move longitudinally of the shaft without turning thereon. Formed integral with the inner extremity of the cylindrical part 9, is a cone member 13, which is engaged by rollers 14, journaled in the forked extremities 15 of inwardly-projecting rods 16, whose outer extremities are pivotally connected, as shown at 17, with the inner extremities of two links 18, the outer extremities of the links being pivotally connected, as shown at 19, with armature members 20, which are eccentrically arranged with reference to the center of the motor. By moving the cone member 13, upon the shaft in the proper direction, the rods 16 will be forced outwardly, whereby each rod through the links 18, acts upon two armature members 20 and moves one extremity of each member 20 outwardly to the desired distance. The extremities of these armature members remote from those connected with the links 18, are pivotally connected, as shown at 21, with projections 22, formed integral with and extending inwardly from the central part 23 of the shell of the motor. The armature members 20 have their extremities connected with spindles 24 and 25 at the points 19 and 21 respectively. The extremities of two armature members 20 are connected with each pair of projections 22 of the motor shell or casing, and it is here that the armature members are nearest the center of the motor.

As shown in the drawing, there are four pairs of armature members 20. The extremities of these members which are connected with the links 18 are farthest from the center of the motor, while their extremities connected with the lugs 22 are nearest the center of the motor.

Made fast to the shaft 5, is a disk 26, into which are screwed a series of duplex cores 27, each having a screw stem 28 engaging a threaded recess formed in the disk 26. Upon the two members 29, of the duplex core are wound coils 30, through which electricity is passed by way of wires 31, respectively connected with the segments of a commutator 33. Engaging this commutator are two brushes 34, mounted on arms 35, connected with the shell of the motor casing and insulated therefrom, as shown at 36.

The current enters the motor through wires 37 and 38, which pass through insulating sleeves 39, inserted in openings 40, formed in the motor casing. These wires are directly connected with the arms 35, which carry the brushes 34 or the positive brushes. The current passes out of the motor through two other brushes, designated 41, which are arranged directly opposite each other and are mounted upon arms 42, carried by the motor casing and with which are connected conductors 43 and 44. It will be observed that the two conductors 37 and 38, are two branches of a single conductor 45, which is divided into two branches before entering the casing. It will also be observed that the two branch conductors 43 and 44, through which the current escapes from the motor merge into a single conductor 46. These two conductors 45 and 46 are respectively connected with the opposite poles of an electric generator, (not shown). The brushes 34 are movably mounted on their arms 35, but are held in close contact with the armature by means of springs 47. This is also true of the brushes 41, which are engaged by springs 48.

As heretofore explained, there is a magnet for each commutator segment and each magnet is connected with its corresponding commutator segment by a wire 31. The coils of each magnet are connected by the conductors 49, which lead from one terminal 50 of each magnet to the opposite terminal 51 of the adjacent magnet. Now if we assume that the various magnets constituting what I have termed the field, or rotary member of the motor are in the position shown in Fig. 2, it will be observed that twelve of the twenty-four magnets with which the rotatable member of the motor is equipped, are energized, while the other twelve are deenergized. The energized magnets are designated by the plus (+) sign and the deenergized magnets by the minus (−) sign. The energized as well as the deënergized magnets are arranged in sets of three, each set of energized magnets being arranged on one side of the point A, which is the nearest point on the armature members approached by the magnets during the rotation of the movable motor member. For instance, referring to the point A uppermost on Fig. 2 of the drawing, the three energized magnets are at the right of the point A or on the approaching side thereof, while the three deenergized magnets are immediately at the left of the energized ones, one deënergized magnet of the set being directly opposite the point A, while the other two are wholly at the left of said point. The current may be traced through the energized magnets from either brush 34, through the commutator segment $a$, a wire 31, the coils 30 of the energized magnet nearest the point A, on the approaching side designated the first magnet, a wire 49, to the terminal 50 of the intermediate magnet of any set, designated the second magnet, through the coils of the latter, thence through an intermediate wire 49, to the third magnet, and thence through another wire 49, and through a second wire 31, to a commutator segment $b$, thence to a negative brush 41, thence out of the motor through one of the branch conductors 43 or 44, and finally through the conductor 46 to the negative pole of the generator, (not shown). It will be observed that the current after passing through the last intermediate conductor 49, does not pass through the coils of the fourth magnet, since the current will take the shortest course, or to the commutator segment $b$, through the conductor 31. The current fails to pass through the coils of the three deënergized magnets adjacent the point A, for the reason that it will take the shortest course to the nearest negative brush 41, which is from the commutator segment $c$, through a wire 31, to an intermediate wire 49, and thence through the three plus (+) magnets at the left of the three minus (−) magnets, referring to the upper part of Fig. 2. By virtue of this construction and arrangement, the three magnets on the approaching side of the point A, are always energized, while the three adjacent magnets on the retreating side (one of which is directly opposite the point A) are always deënergized and there is thus a strong forward pull on the rotating motor member simultaneously in the direction of all of the points A of the armature members of the motor.

In considering the foregoing it must be understood that the rotary member of the motor is traveling in the direction indicated by the arrows in Figs. 2 and 3. However, as these views are both sections taken on Fig. 1, as set forth in their brief description, the views being taken in opposite directions, the arrows indicate the direction of the rotary member pointing in different directions in the two views.

Having thus described my invention, what I claim is:

1. An electric motor, comprising a rotatable member provided with a series of electro-magnets, a commutator whose segments are respectively connected with the coils of the said magnets, positive and negative brushes engaging the commutator, and a stationary armature member eccentrically arranged adjacent to the magnets, means for varying the air gap between the armature and the magnets, the parts being so arranged that the magnets are energized on the approaching side of the shortest air gap, between the magnets and the armature member, substantially as described.

2. An electric motor, comprising a rotatable member provided with a series of electro-magnets, a commutator, whose segments are respectively connected with the coils of the said magnets, positive and negative brushes engaging the commutator, and a pivotally mounted armature member eccentrically arranged adjacent to the magnets, the parts being so arranged that the magnets are energized for a predetermined distance on the approaching side, and deënergized for a predetermined distance on the retreating side of the shortest air gap, between the magnets and the armature member.

3. An electric motor, comprising a rotatable member provided with a series of electro-magnets, a commutator whose segments are respectively connected with the coils of the said magnets, positive and negative brushes engaging the commutator, a pivotally mounted armature member eccentrically arranged adjacent to the outer circumference of the zone of rotation of the magnets, and means for varying the air gap between the armature members and the electro-magnets, the parts being so arranged that a predetermined number of magnets is energized on the approaching side and deënergized on the retreating side of the shortest air gap, between the magnets and the armature member.

4. An electric motor, comprising a rotatable member provided with a series of electro-magnets, a commutator whose segments are respectively connected with the coils of the magnets, the segments of the commutator corresponding in number with the magnets, positive and negative brushes engaging the commutator, whereby magnets are placed in the electrical circuit through the medium of the armature and brushes during the movement of the rotary member of the motor, and whereby the said movement is produced, an armature eccentrically arranged adjacent to the circumference of the zone of rotation of the magnets, and means for moving one extremity of the armature toward or away from the magnets, the brushes being so arranged that the magnets are successively energized at a predetermined point on the approaching side of the shortest air gap, between the magnets and the armature member, and successively deënergized as soon as they reach said gap, substantially as described.

5. An electric motor, comprising a rotary member having a series of electro-magnets, a commutator mounted to rotate with the said member and whose segments correspond in number with the number of the electro-magnets and are respectively connected electrically with the latter, brushes engaging the commutator for placing the magnets successively in the circuit through the medium of the commutator during the movement of the rotary member, a number of armature members eccentrically arranged at intervals around the circumference of the zone of rotation of the rotary member, means for varying the air gap between the armature members and the electro-magnets and suitable connections whereby the magnets are successively energized at a number of points during each revolution of the rotary member, said points being located at predetermined distances from the points corresponding with the location of the shortest air gaps, between the electro-magnets and the various armature members on the approaching side of the air gaps.

6. An electric motor, comprising a rotary member having a series of electro-magnets, a commutator carried by the said rotary member and whose segments are respectively connected with the coils of the said magnets, positive and negative brushes arranged at intervals in engagement with the commutator, whereby the electro-magnets may be energized and deënergized intermittently during the rotation of the rotary member, armature members pivotally and eccentrically arranged at equal intervals around the circumference of the zone of rotation of the electromagnets, the connections being such that the electro-magnets are successively energized at points located at predetermined distances on the approaching side of the shortest air gaps, between the electro-magnets and the various armature members, and successively deënergized at points corresponding approximately with the location of the shortest air gap, between the magnets and the said armatures, substantially as described.

7. An electric motor, comprising a rotary member having a series of electro-magnets arranged at equal intervals on the said member, a commutator also carried by the said member and having segments corresponding in number with the number of the said magnets, said segments being respectively connected electrically with the magnets, brushes engaging the commutator for energizing and deënergizing the magnets successively and intermittently during the rotation of the said member, and armature members pivotally and eccentrically arranged around the zone of rotation of the said magnets, the connections being such that the magnets are successively energized at predetermined points on the approaching side of the shortest air gaps, between the magnets and each of the armature members, and successively deënergized at points corresponding approximately with the shortest air gap, between the electro-magnets and each of the armature members.

In testimony whereof I affix my signature in presence of two witnesses.

HARRY A. RHODES.

Witnesses:
A. J. O'BRIEN,
M. F. MAURY.